United States Patent [19]
Hong et al.

[11] Patent Number: 5,718,649
[45] Date of Patent: Feb. 17, 1998

[54] TENSIONER FOR A POWER TRANSMISSION BELT AND METHOD OF MAKING SAME

[75] Inventors: Richard Hong, Grosse Pt. Wds.; Joseph W. Zamm, Rochester Hills, both of Mich.

[73] Assignee: Dayco Products, Inc., Dayton, Ohio

[21] Appl. No.: 603,044

[22] Filed: Feb. 16, 1996

[51] Int. Cl.$^6$ .............................. F16H 7/12; F16H 7/08; F16H 57/04; F16H 7/22
[52] U.S. Cl. .............................. 474/91; 474/101; 474/109; 474/133; 474/135
[58] Field of Search .............................. 474/91, 94, 101, 474/109, 110, 112, 133, 135

[56] References Cited

U.S. PATENT DOCUMENTS

| | | |
|---|---|---|
| 2,514,137 | 7/1950 | O'Connor . |
| 3,651,903 | 3/1972 | Butler et al. . |
| 3,865,216 | 2/1975 | Gryglas . |
| 4,596,538 | 6/1986 | Henderson . |
| 4,601,683 | 7/1986 | Foster . |
| 4,838,839 | 6/1989 | Watanabe et al. . |

FOREIGN PATENT DOCUMENTS

0072134  2/1983  European Pat. Off. .

*Primary Examiner*—David J. Bagnell
*Assistant Examiner*—Gary S. Hartmann
*Attorney, Agent, or Firm*—Joseph V. Tassone

[57] ABSTRACT

A tensioner for a power transmission belt and a method of making same are provided. The tensioner includes an arm that carries a belt engaging unit and is adapted to be pivotably mounted to a support unit. A mechanical first spring is operatively associated with the support unit and the arm for urging the arm, and hence the belt engaging unit, relative to the support unit and against the belt for tensioning same. A fluidic dampener is operatively associated with the support unit and the arm to dampen movement of the arm relative to the support unit. The dampener comprises a first plate fixed to the support unit, a second plate fixed to the arm for rotation therewith and relative to the first plate, a second spring urging the first and second plates against one another, friction material disposed between part of the facing surfaces of the first and second plates, and fluid disposed between the facing surfaces of the first and second plates.

20 Claims, 7 Drawing Sheets

TENSIONER FOR A POWER TRANSMISSION BELT AND METHOD OF MAKING SAME

BACKGROUND OF THE INVENTION

1. Field of the Invention

This invention relates to a new tensioner for a power transmission belt and to a method of making such a tensioner.

2. Prior Art Statement

It is known to provide a tensioner for a power transmission belt that is carried by support means, the tensioner comprising an arm that carries belt engaging means and is adapted to be pivotably mounted to the support means, mechanical first spring means operatively associated with the support means and the arm for urging the arm, and hence the belt engaging means, relative to the support means and against the belt for tensioning same, and dampening means operatively associated with the support means and the arm to dampen movement of the arm relative to the support means. See the U.S. Patent to Henderson, U.S. Pat. No. 4,596,538. This known tensioner for damping rotary motion utilizes a dry friction plate in physical contact with a moving surface.

It is also known to provide fluid dampening by means of fluid-generated resistance to moving parts that are provided with, for example, vanes or holes. For example, see the U.S. Pat. No. 4,601,683 to Foster, the U.S. Pat. No. 3,865,216 to Gryglas, and the U.S. Pat. No. 2,514,137 to O'Connor.

Other fluid dampeners are also known, with such arrangements operating on the principle of shear drag; there is no contact between the moving components of these devices. For example, see U.S. Pat. No. 3,651,903 to Butler et al, U.S. Pat. No. 4,838,839 to Watanabe et al, and the European Patent Application 0 072 134 of Heater et al.

SUMMARY OF THE INVENTION

It is therefore an object of the present invention to overcome the drawbacks of the heretofore known tensioners and to provide a tensioner for a power transmission belt that in a straightforward manner provides a unique fluidic dampening means that also reduces wear between the components involved in the dampening action.

This object is realized pursuant to the inventive tensioner for a power transmission belt in that the dampening means is a fluidic dampening means and comprises first plate means fixed to the support means, second plate means fixed to the arm for rotation therewith and relative to the first plate means, second spring means urging the first and second plate means against one another, friction material disposed between part of facing surfaces of the first and second plate means, and fluid disposed between at least part of the facing surfaces of the first and second plate means.

Accordingly, it is an object of this invention to provide a novel tensioner having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Other objects, uses and advantages of this invention are apparent from a reading of the specification in conjunction with the accompanying schematic drawings, which form a part thereof and wherein:

DESCRIPTION OF PREFERRED EMBODIMENTS

While the various features of this invention are hereinafter illustrated and described as providing a belt tensioner for power transmission belts of motor vehicle engines, it is to be understood that the various features of this invention can be utilized singly or in various combinations thereof to provide a belt tensioner for other systems as desired.

Therefore, this invention is not to be limited to only the embodiments illustrated in the drawings because the drawings are merely utilized to illustrate one of the wide variety of uses of this invention.

Referring now to the drawings, the improved belt tensioner of this invention, which is generally indicated by the reference numeral 20, is shown being utilized to provide a tensioning force on a belt 21, such as an endless power transmission belt that is used to drive a plurality of accessories of a transportation vehicle. The belt tensioner 20 is shown mounted on a mounting bracket 22 which in turn is mounted on, or is part of, for example, a motor or engine of the transportation vehicle. The endless power transmission belt 21 may be of any suitable type known in the art.

The magnitude of tightness of such power transmission belts varies in a cyclical manner and as a function of the loads imposed thereon. Such cyclical loads that are imposed on the belt tend to cause the belt to vibrate or oscillate. In addition, normal belt wear and heat variations in the engine compartment of a vehicle produce variations in the length of the belt; such variations must be compensated for.

It is known that it is difficult to maintain a belt such as the belt 21 under tension with a force required to ensure non-slipping engagement and driving of various pulleys. However, it is believed that the improved belt tensioner 20 of the present invention functions in a manner that provides a proper tensioning force on the belt 21 to overcome the aforementioned problems. In particular, the improved belt tensioner 20 provides the required tension of the belt 21 as well as prevents any tendency of the belt to oscillate in an undesirable manner as a result of cyclical load changes imposed thereon.

The belt tensioner 20 of this invention comprises a support means 24 that is adapted to be fixed to the mounting bracket 22. A belt engaging means 25 is movably carried by the support means 24 in a manner that will be described subsequently. The tensioner 20 also has mechanical spring means 26 operatively associated with the support means 24 and the belt engaging means 25 to tend to urge the belt engaging means 25 against the slack side of the belt 21.

The belt tensioner 20 also includes a fluidic dampening means that is generally indicated by the reference numeral 28 and is operatively associated with the support means 24 and the belt engaging means 25 to dampen movement of the belt engaging means relative to the support means in a manner that will be described in detail subsequently.

In the embodiment illustrated in FIGS. 1–4, the support means 24 includes a shaft 30 that is secured to the mounting bracket 22, for example by means of a bolt. The shaft 30 has two ends, namely 31 and 32. Disposed in a fixed manner on the splined end 31 of the shaft 30 is a case or housing 33. Disposed about the shaft 30 is a tube or bushing 34 about which is mounted the arm 36 on which in turn the belt engaging means 25 is movably mounted. To effect a pivotable mounting of the arm 36 about the bushing 34 or the shaft 30, the arm 36 is provided with a tubular extension 37 that allows the arm to be supported essentially over the entire length of the shaft 30 between the ends 31 and 32 thereof.

Figure 1:
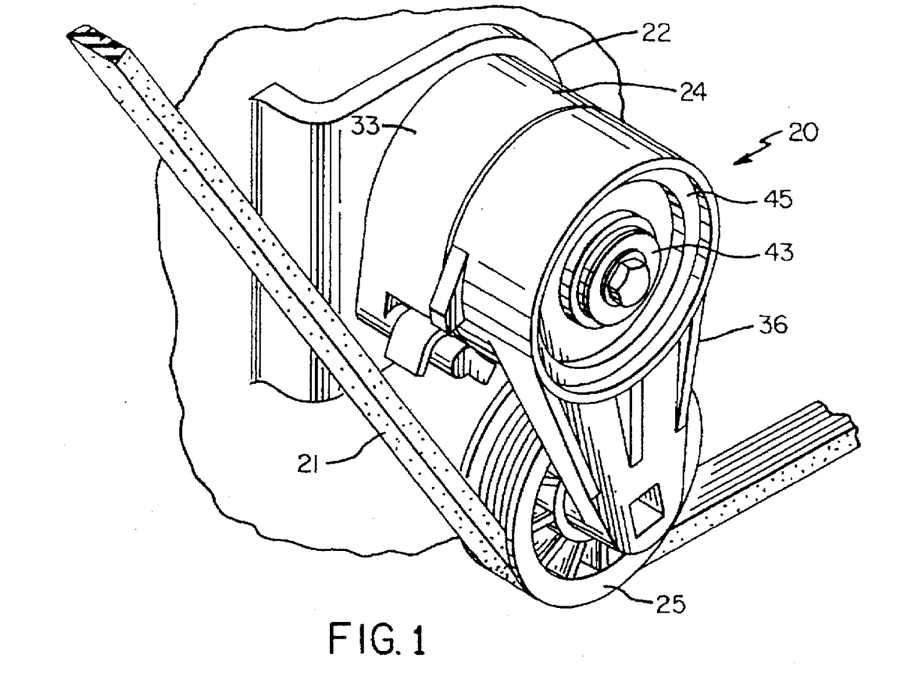
FIG. 1 is a perspective view showing one exemplary embodiment of the tensioner of this invention mounted on an engine.
Figure 2:
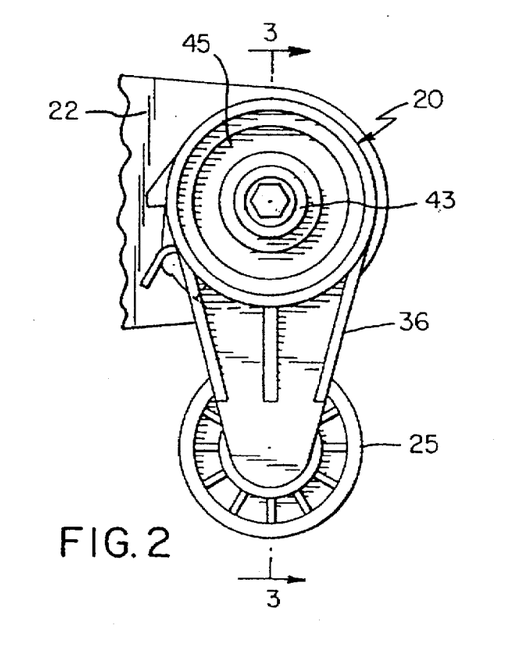
FIG. 2 is a view facing the tensioner of FIG. 1.
Figure 3:
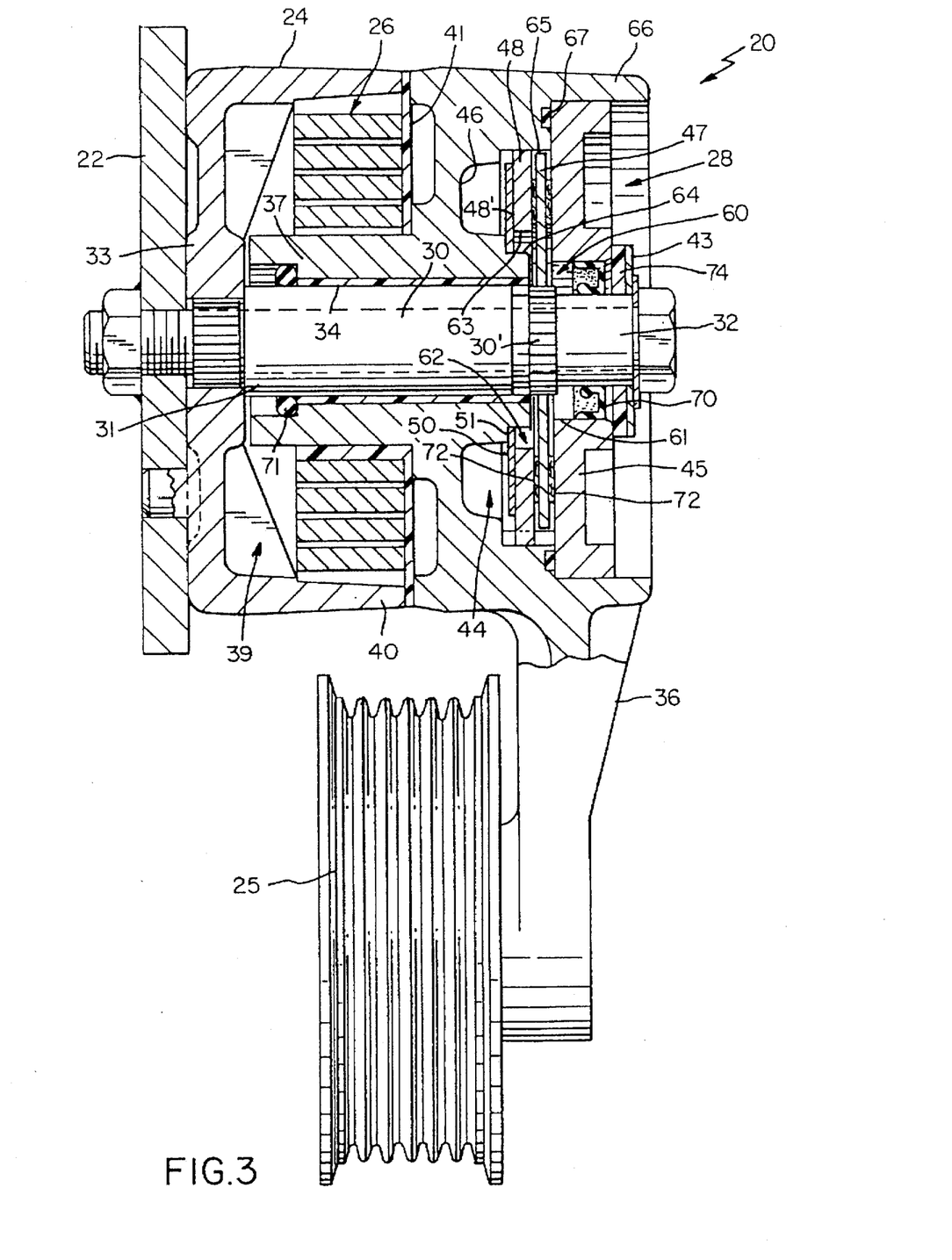
FIG. 3 is a cross-sectional view taken along the line 3—3 in FIG. 2.

The housing 33 is cup-shaped, whereby a chamber 39 is formed therein between the outer leg 40 of the housing 33 and the tubular extension 37 of the arm 36. Disposed within this chamber 39 of the housing 33 is the mechanical spring means 26. An annular spring bushing 41 is disposed between the outer leg 40 of the housing 33 and the arm 36 and extends at right angles to the shaft 30. The arm 36 in turn is held in place on the bushing 34 by an arm plate 43 that is secured to the other end 32 of the shaft 30, for example by being brackered thereto, i.e. the end of the shaft 30 is expanded to hold the arm plate 43 on the shaft. The arm plate 43 could of course also be secured in place on the shaft 30 by means of a nut or the head of a bolt.

Figure 4:
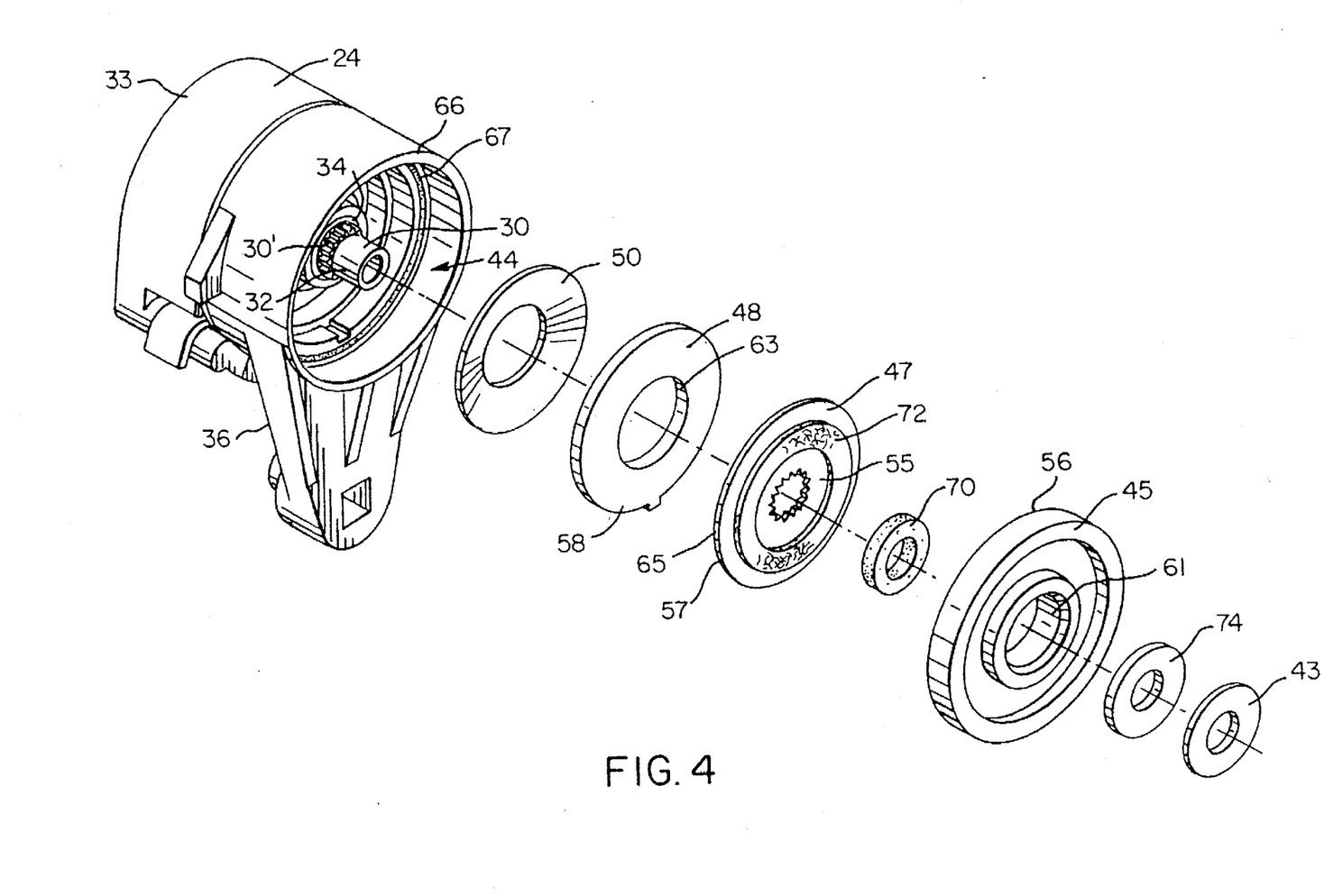
FIG. 4 is an exploded view showing essential components of the tensioner of FIG. 1.

The arm 36 is provided with a recessed portion 44 that accommodates the fluidic dampening means 28. In particular, this fluidic dampening means includes a plate means 45 that is disposed in the recessed portion 44, extends around the shaft 30, and is axially held thereon by the arm plate 43. Disposed on that side of the plate means 45 that faces the inside bottom surface 46 of the recessed portion 44 of the arm 36 is a further plate means 47 that is fixed to the splined portion 30' of the shaft 30. In the illustrated embodiment, an additional load-distributing plate means 48 is disposed between the further plate means 47 and the bottom surface 46 and is keyed to the arm 36. A spring means 50, such as a Belleville or disk spring, is supported against the surface 48' of the further plate means 48 as well as against the shoulder 51 of the extension 37 of the arm 36. During assembly of the components that are disposed in the recessed portion 44 of the arm 36, the spring 50 is depressed by pressing upon the plate means 45; this arrangement of the components, with the spring 50 in its depressed state, is maintained by the plate means 45, which is fixed to the arm in any suitable manner, such as by being press fit thereto.

Friction material is disposed on part of the facing surfaces 55–58 of at least one of the plate means 45, 47 and 48 to dampen movement between these parts. In the illustrated embodiment, friction material 72 in the form of respective annular friction pads are disposed on parts of both of the surfaces 55 and 57 of the further plate means 47 to provide frictional contact between the further plate means 47 and the plate means 45 on the one hand and the additional plate means 48 on the other hand. By a way of example only, the frictional material 72 can have a thickness of about 0.7 mm when first installed.

Contact between the plate means 45, 47 and 48, with the friction material 72 disposed therebetween, is effected by the depressed spring 50, which presses directly against the additional plate means 48 which in turn presses against the friction material 72 and hence against the further plate means 47, whereupon the friction material 72 on the other side of the plate means 47 is then pressed against the plate means 45, thus effecting dampening of the relative movement between the arm 36, and hence the belt engaging means 25, on the one hand, and the shaft 30, and hence the support means 24, on the other hand. The dampening means 28 acts in the manner of a wet clutch dampener in that fluid, for example an automatic transmission type fluid such as DEXTRON, is present in the recessed portion 44, and in particular, fluid is provided on opposite sides of the further plate means 47, so that the friction material is submerged in fluid on the one hand between the further plate means 47 and the plate means 45 and on the other hand between the further plate means 47 and the additional plate means 48. The fluid is provided between only part of the facing surfaces 55 and 56 on the one hand and 57 and 58 on the other hand of the plate means 45, 47 and 47, 48 respectively, with the actual contact between the plate means 45, 47, 48 being effected by the interposition of the friction material 72 between part of these facing surfaces, as indicated previously.

Fluid can also be present between the additional plate means 48 and the bottom surface 46 of the recessed portion 44. In addition, fluid can be present in the chamber 60 formed by the recessed portion 61 of the plate means 45, as well as in the chamber 62 formed between the radially inwardly facing surface 63 of the additional plate means 48 and the portion 64 of the tubular extension 37 of the arm 36. Fluid can also be present between the radially outer surface 65 of the further plate means 47 and the outer leg 66 of the arm 36. To prevent leakage of fluid into the area of the mechanical spring means 26, several seal means are provided. For example, an O-ring 67 is provided between the inwardly facing surface 56 of the plate means 45 and the facing surface of the arm 36. In addition, a lip seal 70 is provided in the recessed portion 61 of the plate means 45 and is in contact with the shaft 30. Since fluid may also be present between the shaft 30 and the bushing 34 and/or the bushing 34 and the tubular extension 37 of the arm 36, a further seal means 71 is expediently provided in the vicinity of the end 31 of the shaft 30. In addition to allowing the friction material 72 to operate properly for effecting dampening between the respective plate means, the fluid also provides a smooth, quiet operation and reduces wear. In addition, the fluid helps to prevent corrosion and keep out contamination.

As can be seen in particular in FIGS. 3 and 4, rather than having the plate means 45 rest directly against the arm plate 43, an arm plate bushing 74 can be disposed between the plate means 45 and the arm plate 43; the arm plate controls the axial movement of the plate means.

Figure 5:
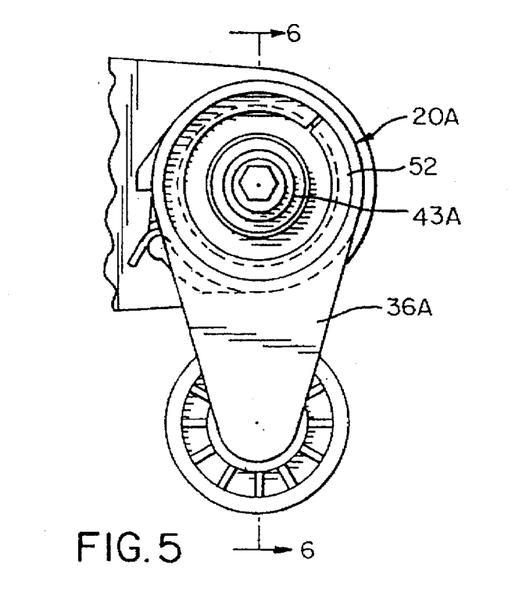
FIG. 5 is a view similar to that of FIG. 2 of a second exemplary embodiment of a tensioner of this invention.

Although the embodiment illustrated in FIGS. 1–4 provides for a press fit retention of the plate means 45 in the outer leg 66 of the arm 36, it has also been found according to the teachings of this invention that the plate means 45 need not be supported directly by the retaining means formed by such a press fit and the arm plate 43. For example, reference is now made to FIGS. 5–7, wherein another belt tensioner of this invention is generally indicated by the reference numeral 20A and parts thereof similar to the belt tensioner 20 of FIGS. 1–4 are indicated by like reference numerals followed by the reference letter "A".

Figure 6:
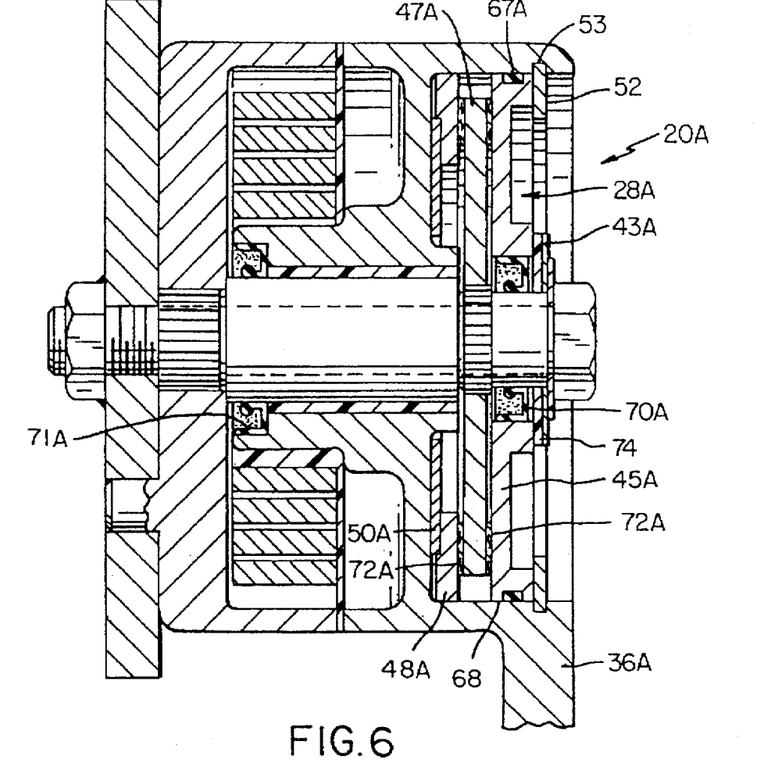
FIG. 6 is a cross-sectional view taken along the line 6—6 in FIG. 5.
Figure 7:
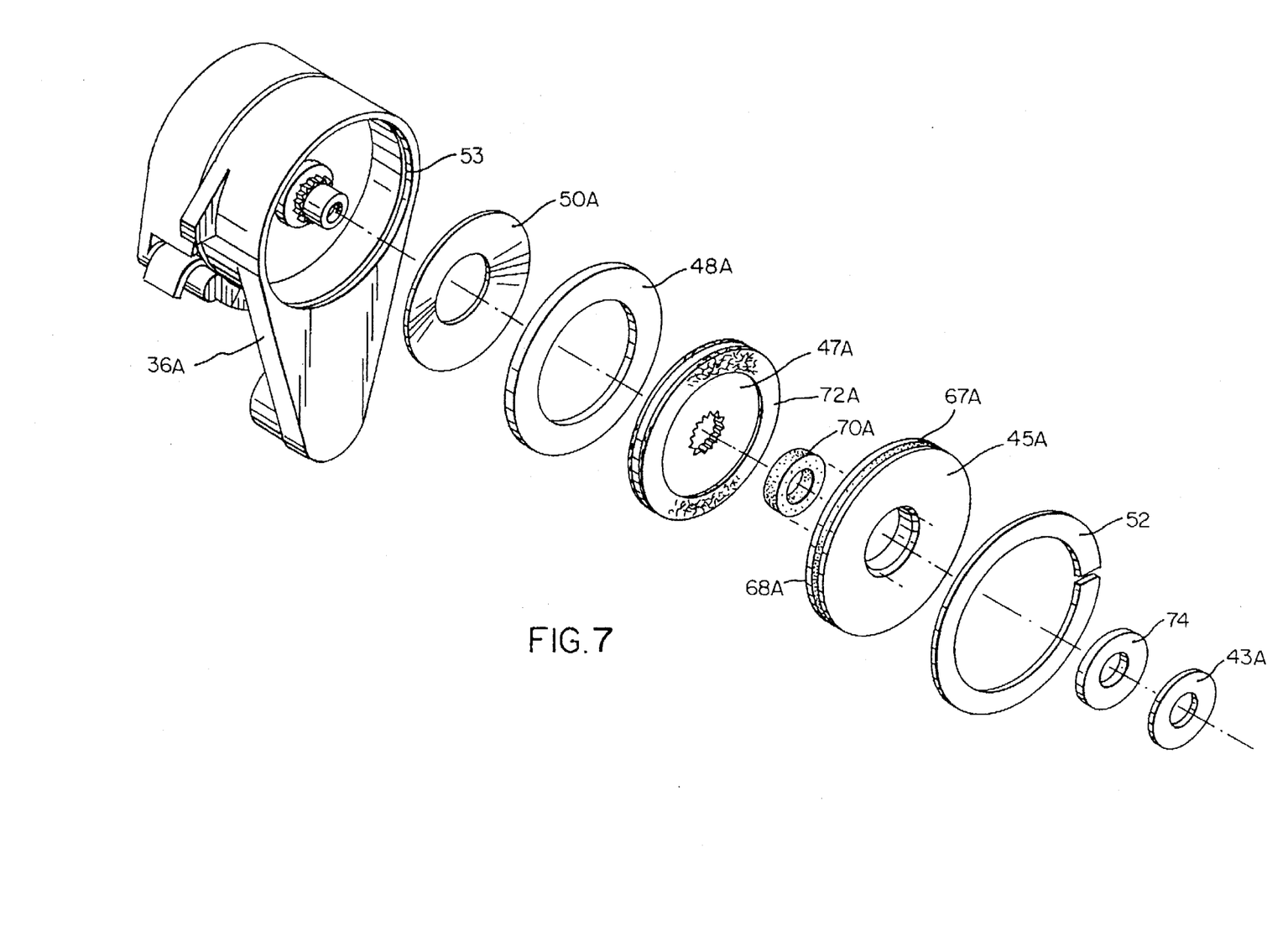
FIG. 7 is an exploded view showing essential components of the tensioner of FIG. 5.

As illustrated in FIG. 6, the arrangement of the components of the fluidic dampening means 28A, with the spring 50A in its depressed state, is maintained not only by the arm plate 43A, but also by means of the snap ring 52, which is secured in position against the plate means 45A by being disposed in a notch 53 that is provided in the outer leg of the arm 36A.

This embodiment also differs slightly from that of the embodiment of FIGS. 1–4 by the placement of the O-ring 67A, which in this embodiment is provided between the radially outer surface 68 of the plate means 45A and the outer leg of the arm 36A. In addition, the further seal means 71A is in this embodiment expediently in the form of a lip seal.

The belt tensioners 20 and 20A of this invention have been described as having the plate means 45, 47 and 48 disposed in the recessed portion 44 of the arm 36. However, it is also possible for the plate means of the fluidic dampening means 28 to be disposed within the chamber of the housing. For example, such a tensioner is generally indicated by the reference numeral 20B in FIGS. 8–11, and parts thereof similar to the tensioners 20 and 20A that have previously been described are indicated by like reference numerals followed by the reference letter "B".

In the embodiment illustrated in FIGS. 8–11, the support means 24B again includes a shaft 30B that is secured to the mounting bracket 22B, for example by means of a bolt. The shaft 30B has two ends, namely 31B and 32B, which are preferably in the form of splined ends. Disposed in a fixed manner on the end 31B of the shaft 30B is a case or housing 33B. Disposed about the shaft 30B and fixed relative thereto is a tube or bushing 34B about which is pivotably mounted the arm 36B on which in turn the belt engaging means 25B is movably mounted. To effect the pivotal mounting of the arm 36B on the bushing 34B of the shaft 30B, the arm 36B is provided with the tubular extension 37B that allows the arm to be supported essentially over the entire length of the shaft 30B between the splined ends 31B and 32B thereof.

Figures 8, 9, 10:
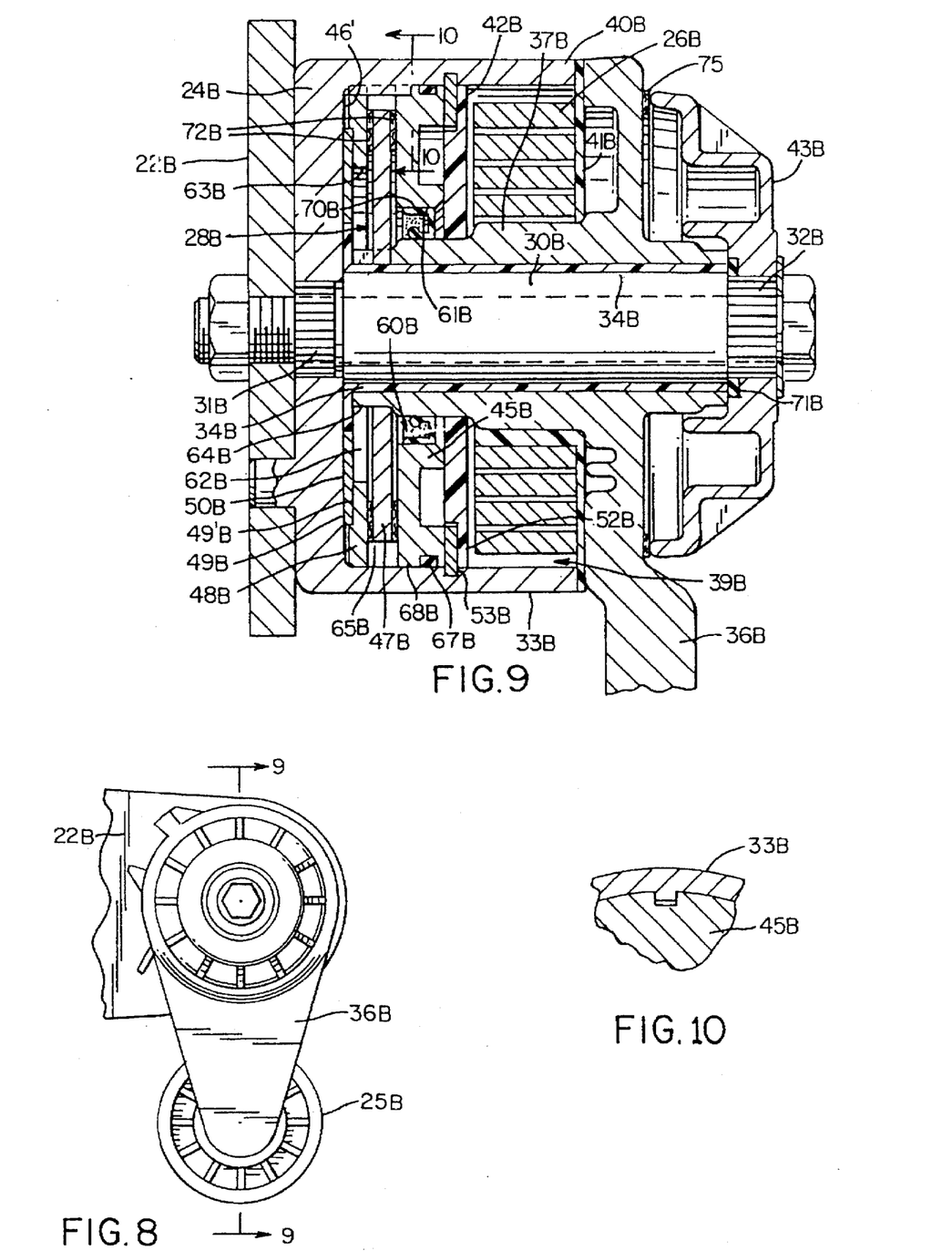
FIG. 8 is a view similar to that of FIG. 2 showing a third exemplary embodiment of a tensioner of this invention.
FIG. 9 is a cross-sectional view taken along the line 9—9 in FIG. 8.
FIG. 10 is a cross-sectional view taken along the line 10—10 in FIG. 9.
Figure 11:
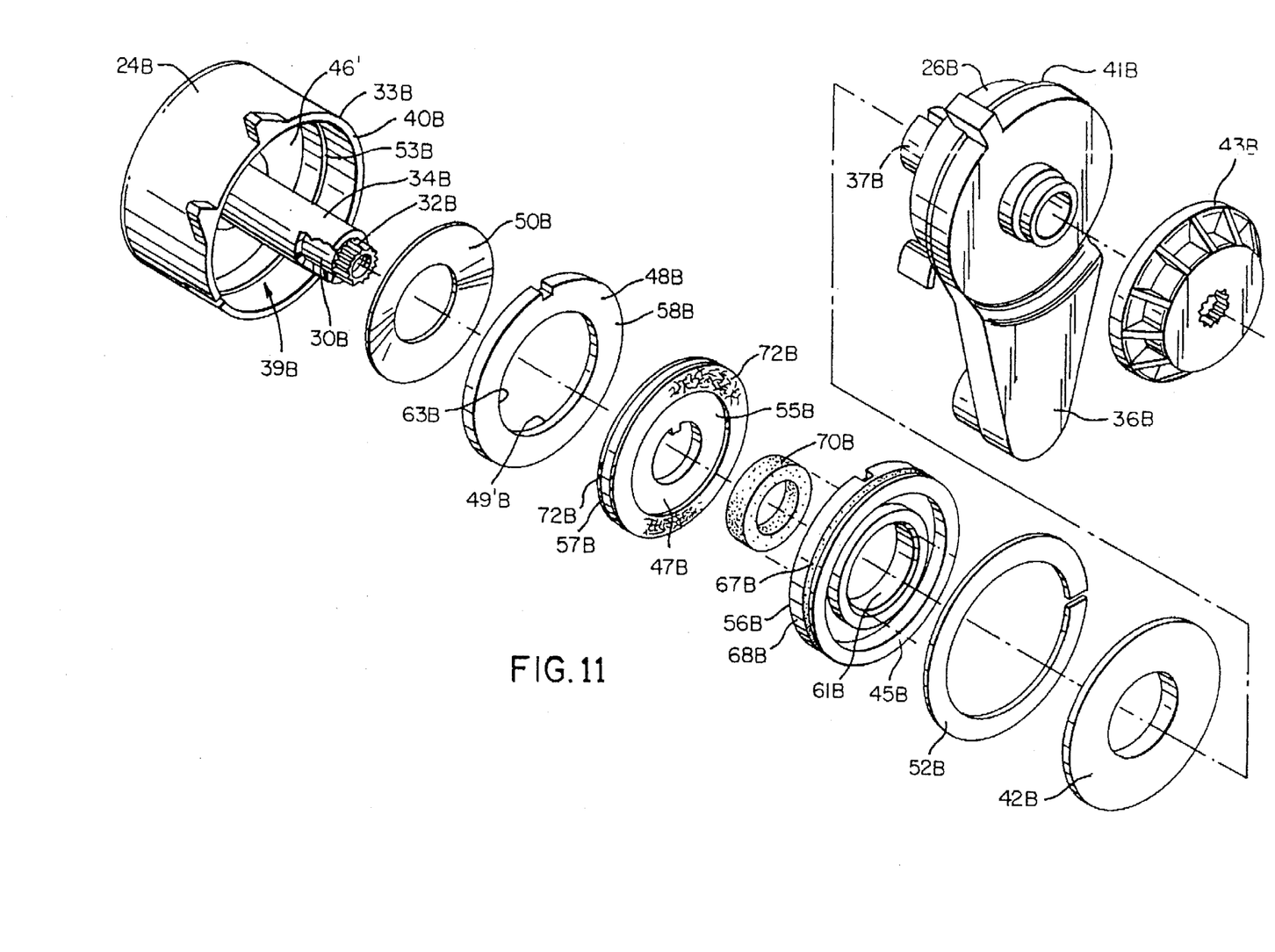
FIG. 11 is an exploded view showing essential components of the tensioner of FIG. 8.

The housing 33B is also cup-shaped, whereby a chamber 39B is formed therein between the outer leg 40B of the housing 33B and the tubular extension 37B of the arm 36B. Disposed within this chamber 39B of the housing 33B is the mechanical spring means 26B, which is supported between the spring bushings 41B and 42B. The annular spring bushing 41B is disposed between the outer leg 40B of the housing 33B and the arm 36B, with the arm in turn being held in place on the bushing 34B by an arm plate or cap 43B that is secured to the other splined end 32B of the shaft 30B.

The fluidic dampening means 28B includes a plate means 45B that is disposed in the chamber 39B of the cup-shaped housing 33B on that side of the spring bushing 42B that faces the inside bottom surface 46' of the housing 33B. The plate means 45B is keyed to the housing 33B (see FIG. 10) and is therefore fixed in position. A further plate means 47B is disposed between the plate means 45B and the bottom surface 46'. This further plate means 47B is keyed to the arm 36B and rotates therewith. In this embodiment also, an additional load-distributing plate means 48B is disposed between the further plate means 47B and the bottom surface 46'. The additional plate means 48B is furthermore provided with a recessed portion 49B, whereby a spring means 50B, such as a Belleville or disk spring, is supported against the surface 49'B of the recessed portion 49B as well as against the bottom surface 46' of the housing 33B. During assembly of the components that are disposed in the chamber 39B of the housing 33B, the spring 50B is depressed by pressing upon the plate means 45B; this arrangement of the components, with the spring 50B in its depressed state, is in this embodiment maintained by means of the snap ring 52B, which is secured in position against the plate means 45B by being disposed in a notch 53B provided in the outer leg 40B of the cup-shaped housing 33B.

Frictional material is again disposed on part of the facing surfaces 55B–58B of at least one of the plate means 45B, 47B and 48B. In the illustrated embodiment, frictional material 72B in the form of respective annular friction pads are disposed on parts of both of the surfaces 55B and 57B of the further plate means 47B to provide frictional contact between the further plate means 47B and the plate means 45B and the additional plate means 48B on the other hand.

Contact between the plate means 45B, 47B and 48B, with the friction material 72 disposed therebetween, is again effected by the depressed spring 50B, which presses directly against the additional plate means 48B which in turn presses against the friction material 72B of the further plate means 47B, whereupon the friction material 72B on the other side of the plate means 47B is then pressed against the plate means 45B. In this embodiment, the dampening means 28B acts in the manner of a wet clutch dampener in that fluid is present in the chamber 39B, and in particular, fluid is provided on opposite sides of the further plate means 47B, so that the friction material is submerged in fluid on the one hand between the further plate means 47B and the plate means 45B, and on the other hand between the further plate means 47B and the additional plate means 48B. Again, the fluid is provided between only part of the facing surfaces 55B and 56B on the one hand and 57B and 58B on the other hand of the plate means 45B, 47B and 47B, 48B respectively.

Fluid can also be present between the additional plate means 48B and the bottom surface 46' of the housing 33B. In addition, fluid can be present in the chamber 60B formed by the recessed portion 61B of the plate means 45B, as well as in the chamber 62B formed between the radially inwardly facing surface 63B of the additional plate means 48B and the outer end 64' of the tubular extension 37B of the arm 36B. Fluid can also be present between the radially outer surface 65B of the further plate means 47B and the outer leg 40B of the housing 33B. To prevent leakage of fluid into the area of the mechanical spring means 26B, several seal means are provided. For example, an O-ring 67B is provided between the radially outer surface 68B of the plate means 45B and the outer leg 40B of the housing 33B. In addition, a lip seal 70B is provided in the recessed portion 61B of the plate means 45B and is in contact with the tubular extension 37B of the arm 36B. Since fluid may also be present between the shaft 30B and the bushing 34B and/or the bushing 34B and the tubular extension 37B of the arm 36B, a further seal means 71B is expediently provided in the vicinity of the end 32B of the shaft 30B. The housing 33B is also sealed relative to the shaft 30B by means of a sealant, such as PERMATEX, that is disposed on the splined end 31B of the shaft.

If desired, an additional dry friction plate 75 could be disposed between the arm plate 43B and the arm 36B if for certain applications further frictional dampening is desirable.

In the embodiments of the belt tensioner 20, 20A and 20B illustrated in FIGS. 1–11, the presently preferred additional plate means 48, 48A, and 48B has been disclosed. However, it is also possible for the inventive belt tensioner to operate without such additional plate means. In such a case, rather than having the spring means 50, 50A, and 50B press such additional plate means 48, 48A or 48B against the further plate means 47, 47A, or 47B, the spring means could be disposed on that side of the plate means 45, 45A, or 45B that is remote from the further plate means 47, 47A or 47B to then press the plate means 45, 45A or 45B against the further plate means, and in particular against the friction material 72, 72A, 72B thereof. For example, in the embodiment illustrated in FIG. 3, if the additional plate means 48 were eliminated, the spring means 50 could be disposed between the plate means 45 and the arm plate 43, which could have a larger diameter to accommodate an appropriately sized spring means 50. Similarly, in the embodiment illustrated in FIG. 9, if the additional plate means 48B is eliminated, the spring means 50B could be disposed between the plate means 45B and the spring bushing 42B.

Therefore, it can be seen that this invention not only provides a new belt tensioner, but also this invention provides a new method of making such a belt tensioner, whereby such a tensioner has a robust design, reduces wear between moving parts, provides better damping control, and is completely sealed to prevent fluid leaks.

While the forms and methods of this invention now preferred have been illustrated and described as required by the Patent Statute, it is to be understood that other forms and method steps can be utilized and still fall within the scope of the appended claims, wherein each claim sets forth what is believed to be known in each claim prior to this invention in the portion of each claim that is disposed before the terms "the improvement", and sets forth what is believed to be new in each claim according to this invention in the portion of each claim that is disposed after the terms "the improvement", whereby it is believed that each claim sets forth a novel, useful and unobvious invention within the pervue of the Patent Statute.

What is claimed is:

1. In a tensioner for a power transmission belt that is carried by support means, said tensioner comprising an arm that carries belt engaging means and is adapted to be pivotably mounted to said support means, mechanical first spring means operatively associated with said support means and said arm for urging said arm, and hence said belt engaging means, relative to said support means and against said belt for tensioning same, and dampening means operatively associated with said support means and said arm to dampen movement of said arm relative to said support means, the improvement wherein said dampening means is a fluidic dampening means and comprises first plate means fixed to said support means, second plate means fixed to said arm for rotation therewith and relative to said first plate means, second spring means urging said first and second plate means against one another, friction material disposed between part of facing surfaces of said first and second plate means, and fluid disposed between said facing surfaces of said first and second plate means.

2. A tensioner as set forth in claim 1, wherein said support means includes a housing and a shaft that is fixed to said housing, and wherein said arm is pivotably mounted on said shaft.

3. A tensioner as set forth in claim 2, wherein said first plate means is disposed in said arm and is fixed to said shaft, and wherein said second plate means is disposed in said arm and is fixed thereto.

4. A tensioner as set forth in claim 3, wherein said second spring means is supported by said arm and presses said second plate means and said first plate means against one another.

5. A tensioner as set forth in claim 3, wherein a third plate means is disposed in said arm on a side of said first plate means that is remote from said second plate means, said third plate means being fixed to said arm, wherein fluid is also disposed between at least part of facing surfaces of said first and third plate means, and wherein said second spring means is supported in said arm and presses said third plate means against said first plate means in order to press the latter against said second plate means.

6. A tensioner as set forth in claim 5, wherein friction material is also disposed between part of facing surfaces of said first and third plate means.

7. A tensioner as set forth in claim 6, wherein said friction material is disposed on opposite sides of said first plate means between part of said facing surfaces of said first and second plate means as well as of said first and third plate means, said friction material being submerged in said fluid.

8. A tensioner as set forth in claim 7, wherein said friction material is an annular friction pad.

9. A tensioner as set forth in claim 3, wherein lip seal means are disposed between said second plate means and said shaft and further seal means are disposed between said arm and said shaft.

10. A tensioner as set forth in claim 9, wherein said further seal means is also a lip seal means.

11. A tensioner as set forth in claim 2, wherein an annular friction pad is operatively disposed between said housing and said arm.

12. A tensioner as set forth in claim 2, wherein said first plate means is disposed in said housing and is fixed thereto, and wherein said second plate means is disposed in said housing and is fixed to said arm.

13. A tensioner as set forth in claim 12, wherein said second spring means is disposed in said housing and presses said first plate means and said second plate means against one another.

14. A tensioner as set forth in claim 12, wherein a third plate means is disposed in said housing on a side of said second plate means that is remote from said first plate means, said third plate means being fixed to said housing, wherein fluid is also disposed between at least part of facing surfaces of said second and third plate means, and wherein said second spring means is supported in said housing and presses said third plate means against said second plate means in order to press the latter against said first plate means.

15. A tensioner as set forth in claim 14, wherein friction material is also disposed between part of facing surfaces of said first and third plate means.

16. A tensioner as set forth in claim 15, wherein said friction material is disposed on opposite sides of said second plate means between part of facing surfaces of said first and second plate means as well as of said second and third plate means, said friction material being submerged in said fluid.

17. A tensioner as set forth in claim 16, wherein said friction material is an annular friction pad.

18. A tensioner as set forth in claim 12, wherein lip seal means are disposed between said first plate means and said shaft, and further seal means are disposed between said arm and said shaft.

19. A tensioner as set forth in claim 2, wherein said first spring means is a spirally wound spring member, one end of which is supported by said housing and the other end of which is connected to said arm, and wherein said second spring means is a disk spring.

20. In a method of making a tensioner for a power transmission belt that is carried by support means, said tensioner comprising an arm that carries belt engaging means and is adapted to be pivotably mounted to said support means, mechanical first spring means operatively associated with said support means and said arm for urging said arm, and hence said belt engaging means, relative to said support means and against said belt for tensioning same, and dampening means operatively associated with said support means and said arm to dampen movement of said arm relative to said support means, the improvement wherein said dampening means is a fluidic dampening means and comprising the steps of fixing first plate means to said support means, fixing second plate means to said arm for rotation therewith and relative to said first plate means, providing second spring means such that said second spring means act against one of said first and second plate means to urge the same against one another, disposing friction material between part of facing surfaces of said first and second plate means, and disposing a film of fluid between at least part of facing surfaces of said first and second plate means.

* * * * *